United States Patent
Van Holsteijn (10) Patent No.: US 10,968,628 B2
(45) Date of Patent: Apr. 6, 2021

(54) GREENHOUSE

(71) Applicant: BOAL SYSTEMEN B.V., 'S-Gravenzande (NL)

(72) Inventor: Gerardus Jacobus Maria Van Holsteijn, Wateringen (NL)

(73) Assignee: BOAL SYSTEMEN B.V., 'S-Gravenzande (NL)

( * ) Notice: Subject to any disclaimer, the term of this patent is extended or adjusted under 35 U.S.C. 154(b) by 0 days.

(21) Appl. No.: 16/686,822

(22) Filed: Nov. 18, 2019

(65) Prior Publication Data

US 2020/0157810 A1 May 21, 2020

(30) Foreign Application Priority Data

Nov. 20, 2018 (EP) ..................... 18207199

(51) Int. Cl.
*E04B 7/16* (2006.01)
*A01G 9/14* (2006.01)
*E04B 1/344* (2006.01)

(52) U.S. Cl.
CPC ............... *E04B 7/163* (2013.01); *A01G 9/14* (2013.01); *A01G 9/1438* (2013.01); *E04B 1/344* (2013.01)

(58) Field of Classification Search
CPC .......... E04B 7/163; E04B 1/344; A01G 9/14; A01G 9/1438; A01G 9/242; A01G 9/227; A01G 9/1407; Y02A 40/25
See application file for complete search history.

(56) References Cited

U.S. PATENT DOCUMENTS 5,564,234 A * 10/1996 Vermeulen ............. A01G 9/242
52/63
6,487,821 B1 * 12/2002 Thomsen ................ E04B 7/163
52/90.1
(Continued)

FOREIGN PATENT DOCUMENTS

DE 202017107842 U1 1/2018
EP 3005857 A1 4/2016
(Continued)

OTHER PUBLICATIONS

European Search Report dated Jun. 3, 2019. for corresponding European Patent Application No. 18207199.3, filed Nov. 20, 2018.

*Primary Examiner* — Rodney Mintz
(74) *Attorney, Agent, or Firm* — Steven M. Koehler; Westman, Champlin & Koehler, P.A.

(57) ABSTRACT

A greenhouse has a roof including a plurality of substantially parallel crossbeams, at least two longitudinal sections which are mounted to the crossbeams and extend at a distance from each other in transverse direction of the crossbeams, a transparent foil which is mounted to the longitudinal sections at respective foil attachment locations thereof so as to form a cover between the longitudinal sections. The roof also includes a displacement mechanism for displacing one of the longitudinal sections with respect to the other between a non-foil-stretching position and a foil-stretching position. The distance between the respective foil attachment locations is larger in the foil-stretching position than in the non-foil-stretching position. The displacement mechanism can be operated and is lockable at an upper side of the roof.

14 Claims, 10 Drawing Sheets

(56) References Cited

U.S. PATENT DOCUMENTS

| | | | |
|---|---|---|---|
| 7,568,307 B1* | 8/2009 | Zimhoni | A01G 9/14 47/17 |
| 9,642,315 B2* | 5/2017 | Lloyd | A01G 9/22 |
| 10,246,876 B2* | 4/2019 | Brean | E04F 10/005 |
| 10,251,346 B2* | 4/2019 | Lloyd | A01G 9/227 |
| 10,407,912 B1* | 9/2019 | White | E04B 7/163 |
| 2009/0183425 A1* | 7/2009 | Zimhoni | A01G 9/241 47/17 |
| 2016/0262318 A1 | 9/2016 | Lloyd | |
| 2017/0238477 A1 | 8/2017 | Lloyd | |
| 2018/0334801 A1* | 11/2018 | Brean | E04B 7/045 |
| 2019/0191635 A1 | 6/2019 | Zuiderwijk et al. | |
| 2020/0315101 A1* | 10/2020 | Nowe | A01G 9/24 |

FOREIGN PATENT DOCUMENTS

| | | | |
|---|---|---|---|
| FR | 2700234 | A1 | 7/1994 |
| WO | 0060192 | A1 | 10/2000 |

* cited by examiner

GREENHOUSE

BACKGROUND

The discussion below is merely provided for general background information and is not intended to be used as an aid in determining the scope of the claimed subject matter.

The present invention relates to a greenhouse having a roof including a plurality of substantially parallel crossbeams, at least two longitudinal sections which are mounted to the crossbeams and extend at a distance from each other in transverse direction of the crossbeams, and a transparent foil which is mounted to the longitudinal sections at respective foil attachment locations thereof so as to form a cover between the longitudinal sections.

A greenhouse having a roof including a transparent plastic foil is known. An advantage of such a roof is its low cost level, whereas its transparency properties are quite good when the foil is stretched upon installing it. A drawback of applying a transparent foil is its decreasing transparency during lifetime due to exposure to UV radiation. This requires repeated replacement of the foil, for example every two years. Particularly, when the crops in the greenhouse occupy a great part of the available space, replacement of the foil appears to be difficult.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A greenhouse according to an aspect of the invention is provided with a displacement mechanism for displacing one of the longitudinal sections with respect to the other between a non-foil-stretching position and a foil-stretching position, wherein the distance between the respective foil attachment locations is larger in the foil-stretching position than in the non-foil-stretching position, wherein the displacement mechanism can be operated and is lockable at an upper side of the roof.

An advantage of the greenhouse is that persons who are replacing the transparent foil can work on the upper side of the roof and operate and lock the displacement mechanism such that the displaceable longitudinal section remains at its foil-stretching position, without damaging the crops inside the greenhouse. For example they can walk on top of the crossbeams and/or on top of the longitudinal sections.

A suitable foil is a plastic foil, for example, such as F-CLEAN® foil, which can be applied very well in the greenhouse cultivation due to its good light transparency properties. The F-CLEAN® foil is stretched by 2%, for example, but different percentages are also possible.

In a practical embodiment the displacement mechanism comprises a pivot between one of the crossbeams and the displaceable longitudinal section, including a pivot axis that extends parallel to the displaceable longitudinal section at a distance from the foil attachment location of the displaceable longitudinal section. Due to a rotational movement of the displaceable longitudinal section the distance between the foil attachment locations along the crossbeams changes.

The pivot axis may be located between the foil attachment locations of the respective longitudinal sections.

The displaceable longitudinal section and the crossbeams may be configured such that the foil attachment location of the displaceable longitudinal section moves upwardly upon displacing it from the foil-stretching position towards the non-foil-stretching position.

In a particular embodiment the displacement mechanism comprises a lock for locking the displaceable longitudinal section and the crossbeam to each other in the foil-stretching position. The lock can be locked and unlocked at an upper side of the roof.

In a more particular embodiment, the lock comprises a bolt which freely passes through a through-hole at the displaceable longitudinal section and which cooperates with a threaded hole in a lip that is locked with respect to the corresponding crossbeam in rotational direction of the bolt and that is at least rotatable with respect to the crossbeam about an axis of rotation which has the same direction as the pivot axis, wherein the displacement mechanism is provided with abutments for limiting movements of the lip with respect to the crossbeam in a direction along the crossbeam and in transverse direction thereof. When the bolt is tightened the lip will be drawn against one of the abutments. When the bolt is loosened the bolt head will move away from the lip and the displaceable longitudinal section is allowed to rotate about the pivot axis since the bolt passes freely through the through-hole at the displaceable longitudinal section.

The displacement mechanism may comprise a slidable connection between the crossbeams and the displaceable longitudinal section, and a locking element for locking the crossbeams and the displaceable longitudinal section to each other in the foil-stretching position of the displaceable longitudinal section. This is a relatively simple displacement mechanism which is suitable for structures in which the distance between the foil attachment locations of the respective longitudinal sections is relatively small.

In a specific embodiment a longitudinal beam is fixed to the crossbeams at the displaceable longitudinal section, wherein the longitudinal beam slidably supports the displaceable longitudinal section, hence forming the slidable connection.

The displaceable longitudinal section may be lockable to the longitudinal beam through at least a clip which fits to upwardly directed projections at the displaceable longitudinal section and the longitudinal beam. This provides the opportunity to fix the clip a simple manner to the projections at an upper side of the roof.

The displaceable longitudinal section, the other longitudinal section and the crossbeams may be part of a window part which is rotatable with respect to the remainder of the roof between a closed position and an open position.

The transparent foil may contact upper sides of the crossbeams in the foil-stretching position of the displaceable longitudinal section.

The crossbeams may be curved, whereas cross-sections of the crossbeams may have curved upper sides. This minimizes damage of the foil upon moving the displaceable longitudinal section from the non-foil-stretching position to the foil-stretching position. Preferably, cross-sections of the crossbeams are circular or elliptic.

BRIEF DESCRIPTION OF THE DRAWINGS

Aspects of the invention will hereafter be elucidated with reference to the schematic drawings showing embodiments of the invention by way of example.

DETAILED DESCRIPTION OF THE ILLUSTRATIVE EMBODIMENTS

Figure 1:
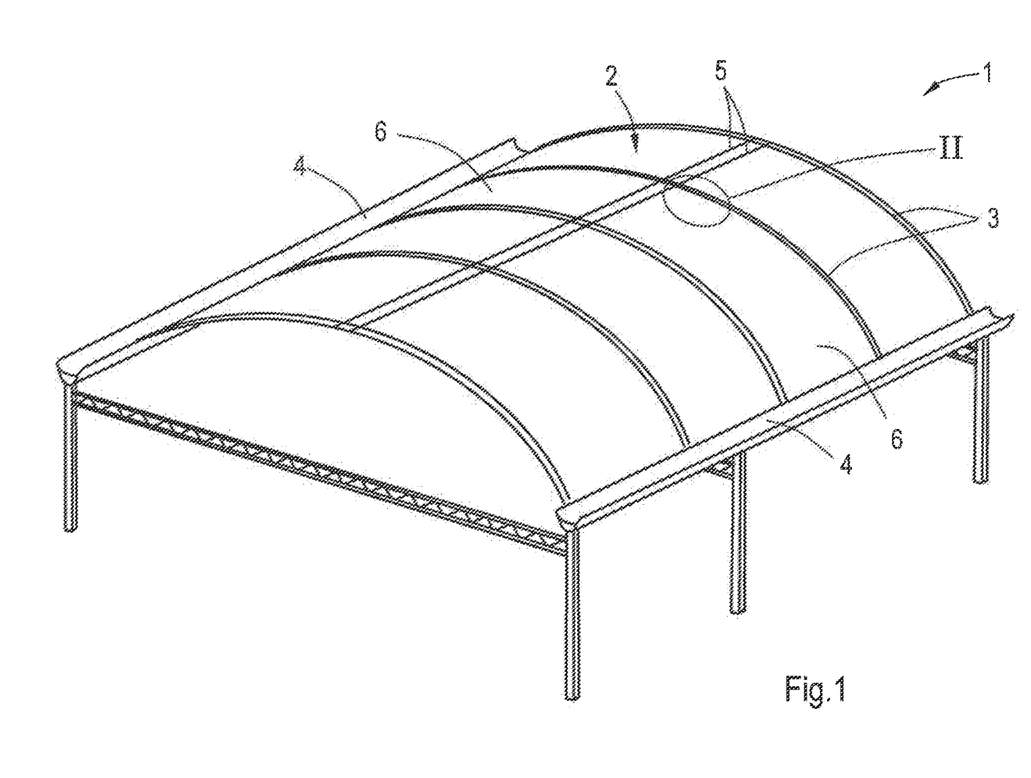
FIG. 1 is a perspective view of an embodiment of a greenhouse.

FIG. 1 shows an embodiment of a greenhouse 1 having aspects of the invention. The greenhouse 1 is provided with an arc-shaped roof 2 which has a plurality of crossbeams 3 that extend parallel to each other. The roof 2 has two gutters 4 which are part of fixed longitudinal sections that are mounted to the crossbeams 3 and extend perpendicular to the crossbeams 3. Furthermore, the roof 2 has two displaceable longitudinal sections 5 which extend parallel to the gutters 4 and which are displaceable with respect to the crossbeams 3 in a direction perpendicular to the gutters 4 along the crossbeams 3. This means that at either side of the roof 2 the distance between the corresponding gutter 4 and the neighbouring displaceable longitudinal section 5 can be varied.

The roof 2 also comprises two transparent foils 6, each mounted to each pair of neighbouring fixed and displaceable longitudinal sections 4, 5, hence forming transparent covers of the greenhouse 1. The longitudinal sections 4, 5 and the crossbeams 3 may be made of extruded aluminium.

FIGS. 2-5 show a part of the roof 2 of the greenhouse 1 in greater detail. The displaceable longitudinal section 5 is provided with a foil receiving slot 7 at a foil attachment location thereof. The foil 6 can be clamped in the foil receiving slot 7 by folding the foil 6 about a rod (not shown) outside the slot 7 and then pressing the rod and the folded foil 6 into the slot 7. Each fixed longitudinal section or gutter 4 is also provided with a foil receiving slot 7 at a foil attachment location thereof (not shown).

Figure 2:
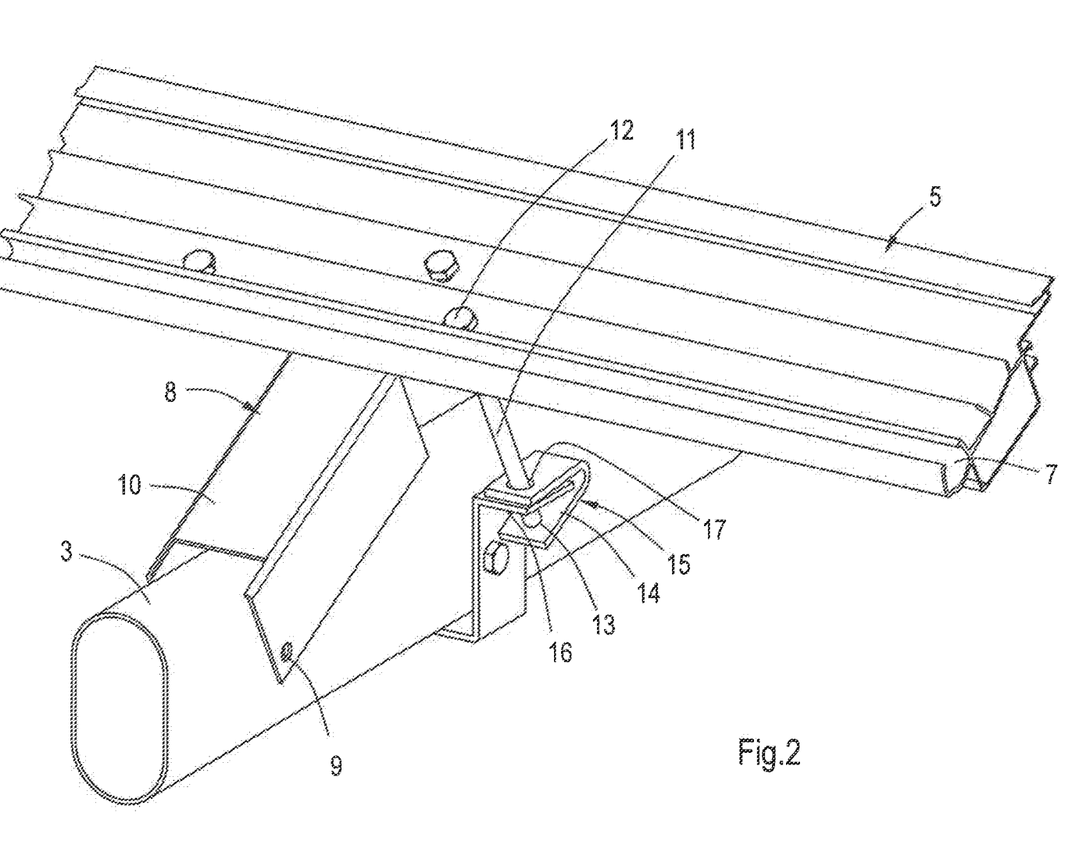
FIG. 2 is a perspective view of a part of the greenhouse according to FIG. 1, which is indicated by II in FIG. 1.
Figure 3:
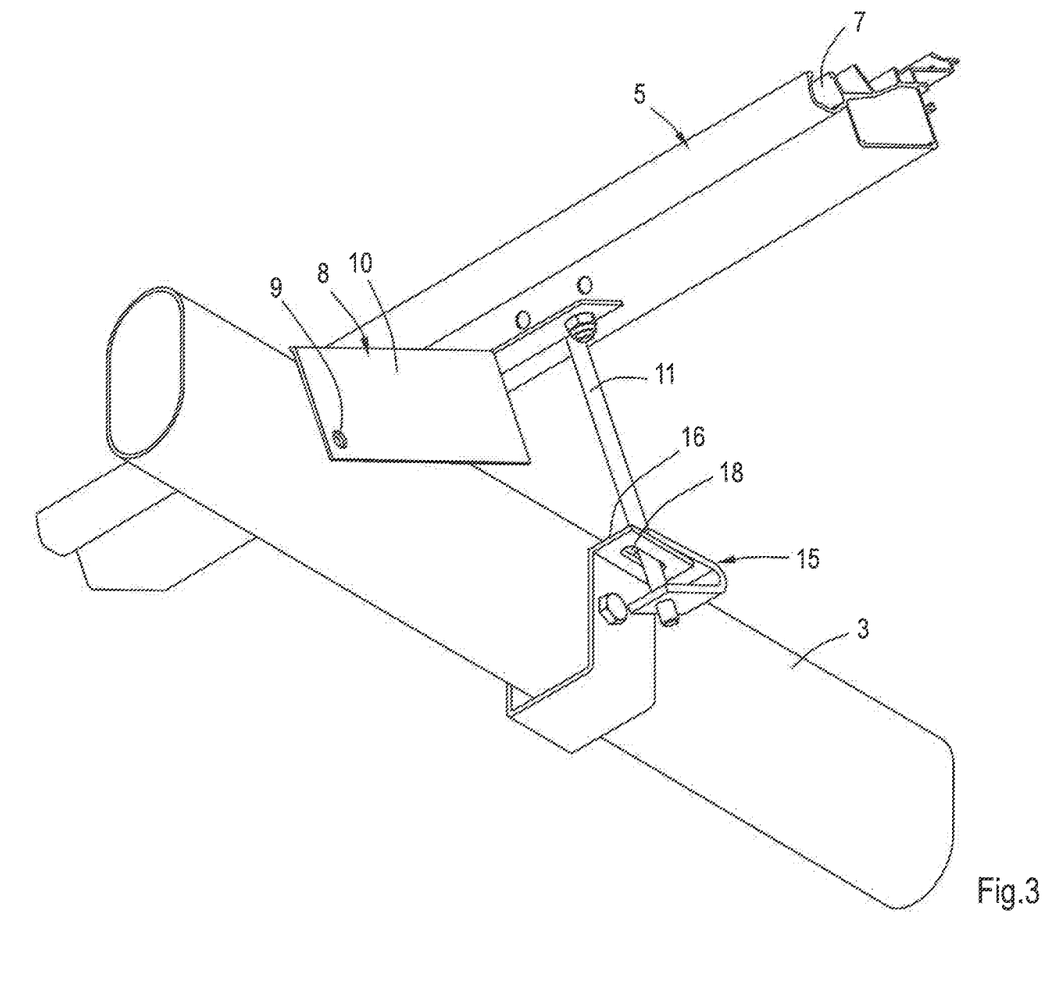
FIG. 3 is a similar view as FIG. 2, but showing the part from below.
Figure 4:
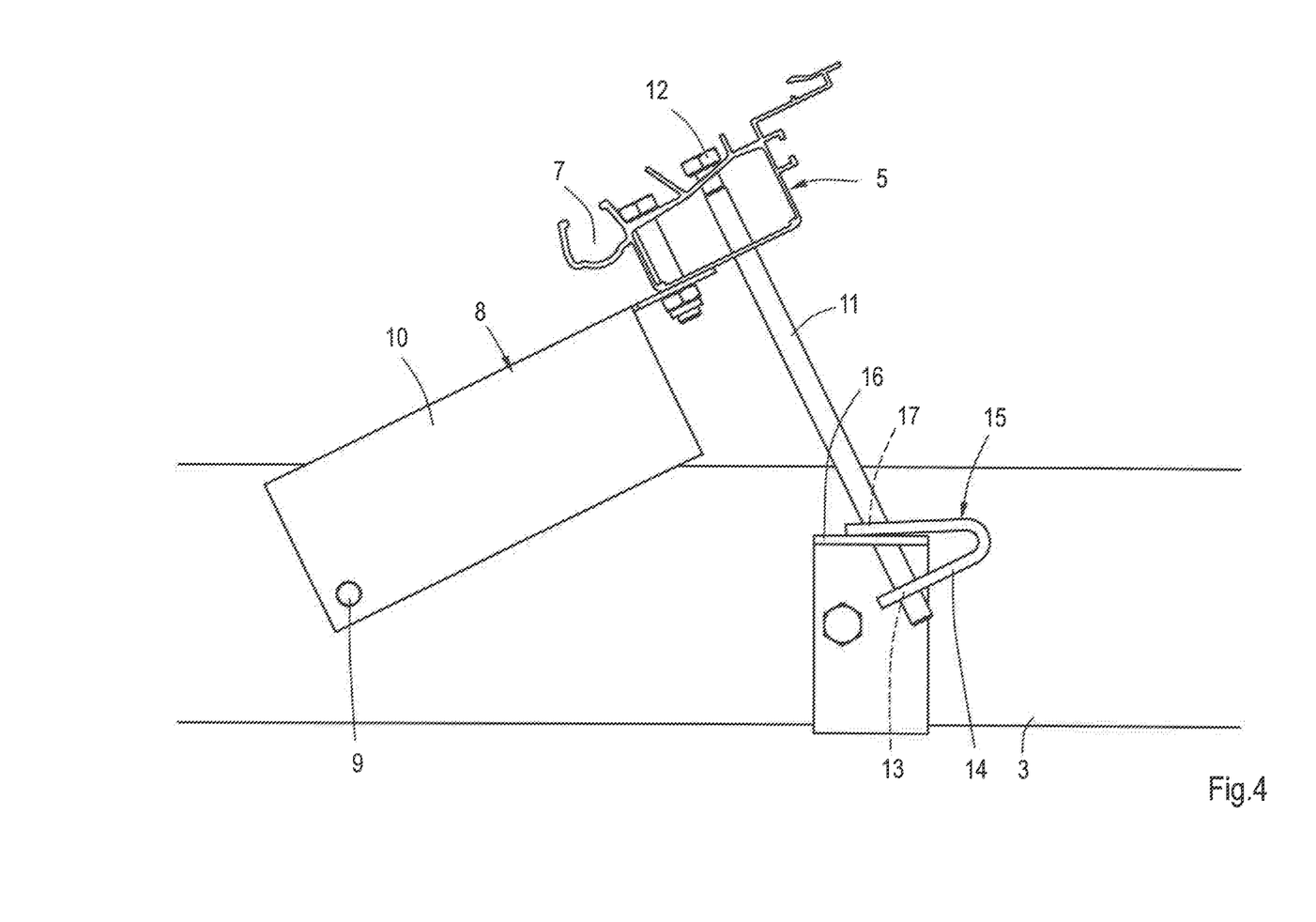
FIG. 4 is a side view of the part as shown in FIGS. 2 and 3.
Figure 5:
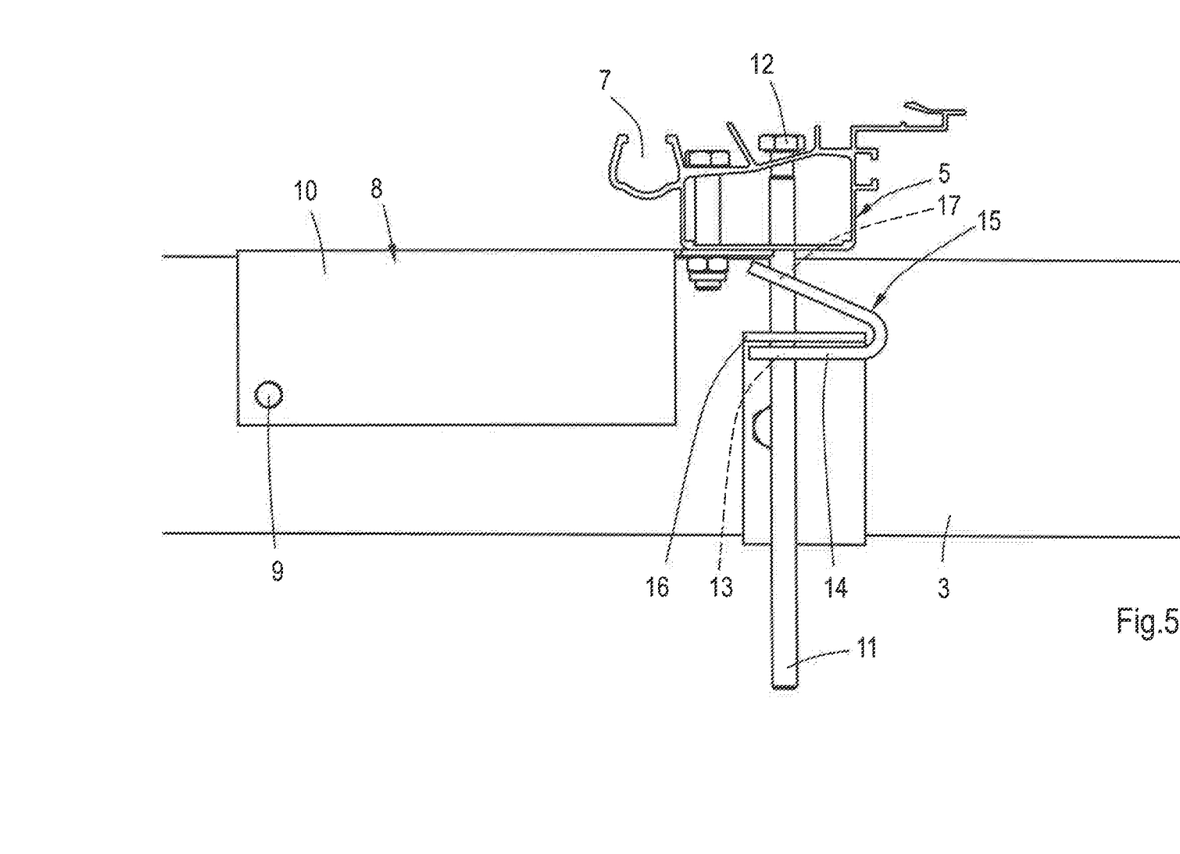
FIG. 5 is a similar view as FIG. 4, but showing the part in a different condition.

The roof 2 of the greenhouse 1 comprises a displacement mechanism 8 for displacing the displaceable longitudinal section 5 with respect to the neighbouring gutter 4 in a direction along the crossbeams 3, such that the distance between their respective foil receiving slots 7 can be varied. This provides the opportunity to stretch the foil 6. FIGS. 2-4 show a condition in which the displaceable longitudinal section 5 is in a non-foil-stretching position and FIG. 5 shows a condition in which the displaceable longitudinal section 5 is in a foil-stretching position. Referring to FIGS. 4 and 5, it is noted that the cooperating fixed longitudinal section or gutter 4 is located at the left side of the displaceable longitudinal section 5.

In the embodiment as shown in FIGS. 2-5 the displacement mechanism 8 comprises pivots 9 and pivot arms 10. Proximal end portions of the pivot arms 10 are rotatably mounted to the respective crossbeams 3 via the corresponding pivots 9, whereas opposite distal end portions of the pivot arms 10 are attached to the displaceable section 5. Each pivot arm 10 has a U-shaped cross-section and fits about the corresponding crossbeam 3. In the foil-stretching position the pivot arms 10 may rest on the respective crossbeams 3, as illustrated in FIG. 5. The pivots 9 have a common pivot axis which extends parallel to the displaceable longitudinal section 5 at a distance from its foil receiving slot 7 and is located between the foil receiving slots 7 of the gutter 4 and the neighbouring displaceable longitudinal section 5, as seen in longitudinal direction of the crossbeams 3. Due to the location of the common pivot axis, the displaceable longitudinal section 5 and the crossbeams 3 the foil attachment location 7 of the displaceable longitudinal section 5 moves upwardly upon displacing it from the foil-stretching position towards the non-foil-stretching position.

The displacement mechanism 8 is provided with a bolt 11 including a bolt head 12. The bolt 11 freely passes through a through-hole in the displaceable longitudinal section 5 and cooperates with a threaded hole 13 in a lip 14. In the embodiment as shown in FIGS. 2-5 the lip 14 is formed by a lower leg of a V-shaped brace 15 and located below a lateral protrusion 16 of the crossbeam 3. An upper leg of the brace 15 is located above the lateral protrusion 16 and has a through-hole 17 through which the bolt 11 freely passes. As shown in FIG. 3 the bolt 11 also freely passes an elongate through-hole 18 in the lateral protrusion 16. The brace 15 is locked with respect to the crossbeam 3 in rotational direction of the bolt 11, but rotatable with respect to the crossbeam 3 about an axis of rotation which has the same direction as the pivot axis of the pivot 9. Furthermore, the bolt 11, the brace 15 and the lateral protrusion 16 form abutments for limiting movements of the lip 14 with respect to the crossbeam 3 in a direction along the crossbeam 3 and in transverse direction thereof.

In the condition as shown in FIG. 4 the lip 14 and the bolt 11 have a fixed position with respect to each other. The upper leg of the brace 15 rests on the lateral protrusion 16, hence avoiding the lip 14 to move downwardly. In this condition it may be possible to rotate the displaceable longitudinal section 5 about the pivot 9 from the non-foil-stretching condition to the foil-stretching condition during which movement the bolt 11 moves through the through-hole in the displaceable longitudinal section 5. This results in an intermediate condition in which the displaceable longitudinal section 5 has the position as shown in FIG. 5, but in which the bolt 11 still projects upwardly from the displaceable longitudinal section 5. During this movement the bolt 11 may move with respect to the displaceable longitudinal section 5 in mainly perpendicular direction with respect to the displaceable longitudinal section 5 since the brace 15 is rotatable and translatable with respect to the lateral protrusion 16, whereas the bolt 11 is movable with respect to the elongate through-hole 18 in the lateral protrusion 16.

After reaching the mentioned intermediate condition the bolt 11 can be screwed downwardly until the situation as shown in FIG. 5 is reached. Hence, the bolt 11 forms a lock of the displacement mechanism 8, which can be operated through the bolt head 12 as being an actuator. In the foil-stretching condition as shown in FIG. 5 the bolt 11 draws the lip 14 against the lower side of the lateral protrusion 16.

An advantage of the present invention is that the actuator or bolt head 12 is located at an upper side of the roof 1 such that an operator can easily operate the displacement mechanism 8 when the foil 6 has to be changed. Upon installing the foil 6 it can be fixed into the respective foil receiving slots 7 when the displaceable longitudinal section 5 is in the non-foil-stretching position as shown in FIG. 4. Subsequently, the operator can push down the displaceable longitudinal section 5 and tighten the bolts 11.

Figure 6:
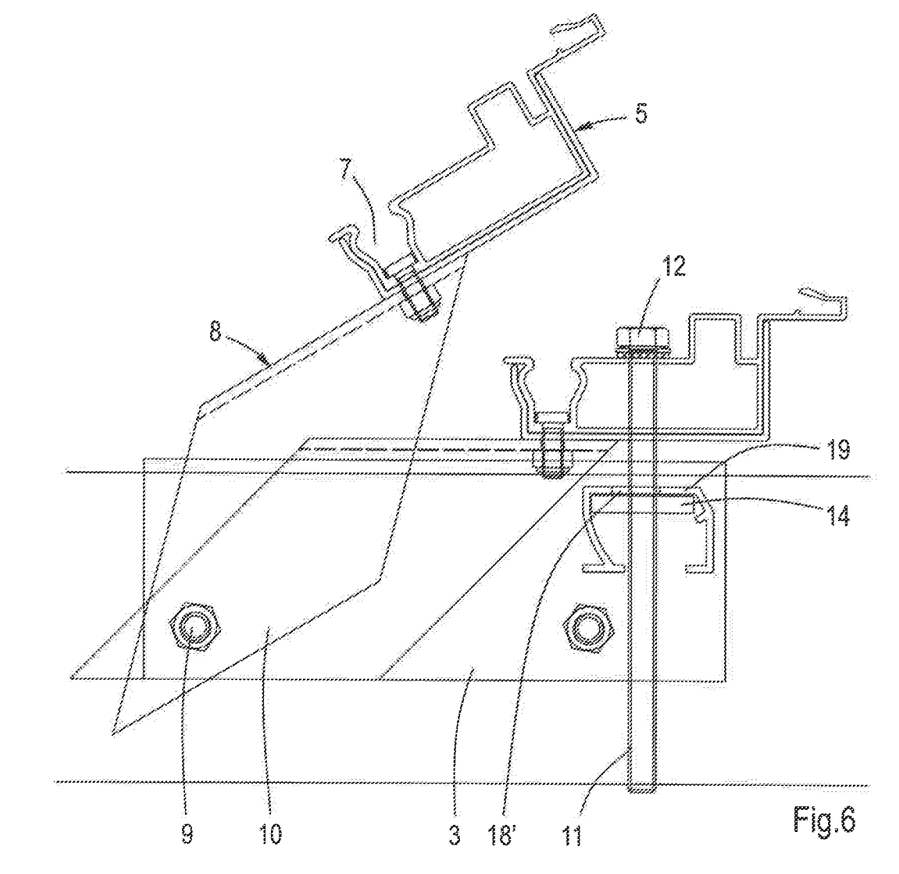
FIG. 6 is a similar view as FIGS. 4 and 5, but showing an alternative embodiment in two conditions.

FIG. 6 shows an alternative embodiment in which the displacement mechanism 8 has a different lock. The lip 14 is formed by a plate that is movable within a profiled section 19 which is fixed to the crossbeam 3. In the foil-stretching condition the bolt 11 draws the lip 14 against an upper wall of the profiled section 19. When the bolt 11 is screwed upwardly and the displaceable longitudinal section 5 is rotated upwardly the lip 14 can rotate about an axis extending in longitudinal direction of the displaceable longitudinal section 5 and displace within the profiled section 19. The upper wall of the profiled section 19 has an elongate through-hole, comparable to the elongate through-hole 18 in the embodiment as described hereinbefore, in order to provide manoeuvring space to the bolt 11 during rotation of the displaceable longitudinal section 5.

Figure 7:
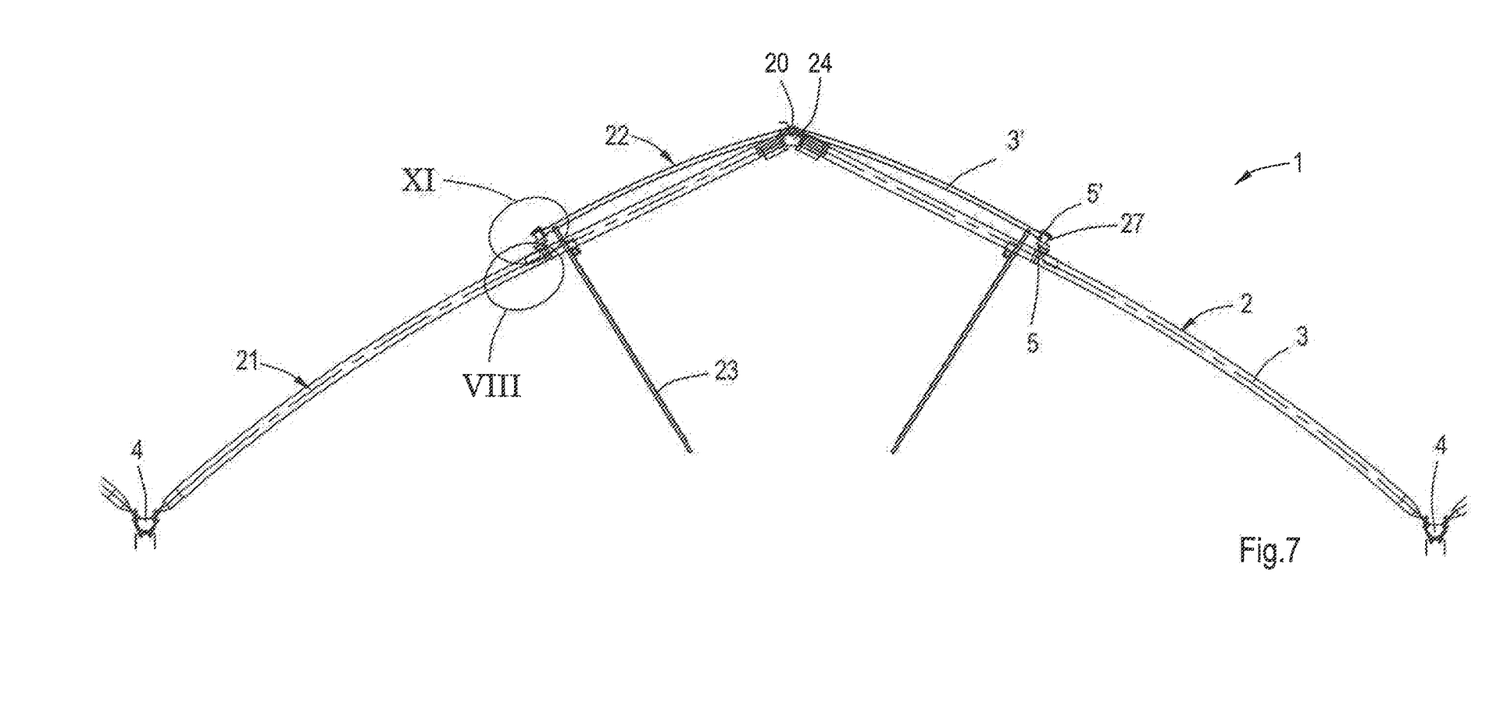
FIG. 7 is a cross-sectional view of an alternative embodiment of the greenhouse.

FIG. 7 shows an alternative embodiment of the greenhouse 1. It has a lot of similarities to the embodiment as shown in FIG. 1. Therefore, corresponding elements are given the same reference number. The greenhouse 1 is provided with a Gothic-arched roof 2 which has a plurality of crossbeams 3 that extend parallel to each other between a ridge section 20 and the respective gutters 4 at opposite sides of the ridge section 20. At each side of the ridge section 20 the roof 2 has a lower roof part 21 and a window part 22. The lower roof part 21 is covered by the foil 6 which extends from the gutter 4 to the displaceable longitudinal section 5 of the lower roof part 21. The gutters 4 form the respective fixed longitudinal section of the respective lower roof parts 21. Similar to the embodiment as shown in FIG. 1 the gutter 4 and the displaceable longitudinal section 5 are mounted to the crossbeams 3 and extend perpendicular to the crossbeams 3. The displaceable longitudinal section 5 of each lower roof part 21 extends parallel to the corresponding gutter 4 and is displaceable with respect to the crossbeams 3 in a direction perpendicular to the gutter 4 along the crossbeams 3. This means that at either side of the roof 2 the distance between the corresponding gutter 4 and the neighbouring displaceable longitudinal section 5 can be varied.

The window parts 22 are pivotally mounted to the ridge section 20 and are each rotatable between a closed position as shown in FIG. 7 and an open position. The window parts 22 can be opened in a known manner by means of rack bars 23. Each of the window parts 22 is provided with an upper window beam 24 which is rotatably mounted to the ridge section 20 and forms the fixed longitudinal section of the window part 22. Furthermore, the window part 22 comprises window crossbeams 3' and a displaceable longitudinal section 5'. The upper window beam 24 and the displaceable longitudinal section 5' of the window part 22 are mounted to the window crossbeams 3' and extend perpendicular to the window crossbeams 3'.

Figure 8:
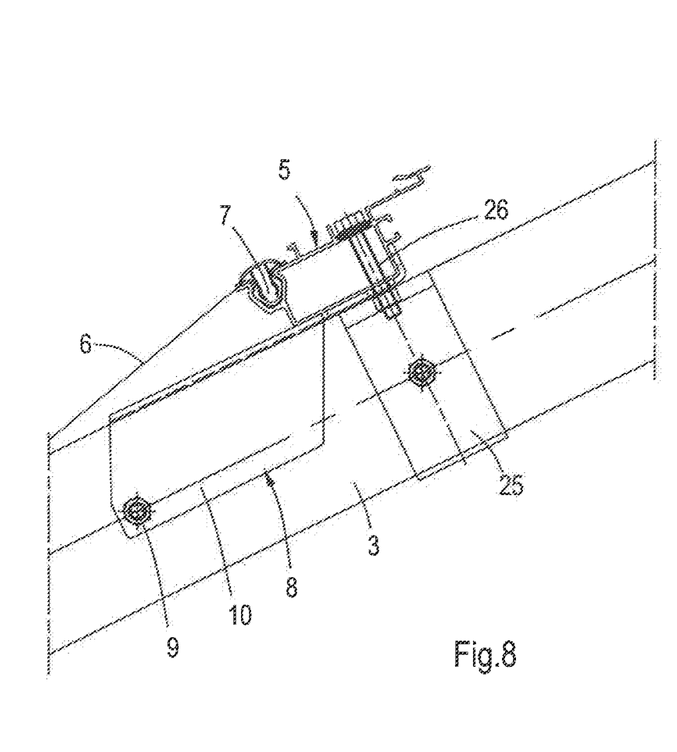
FIG. 8 is an enlarged view of a part of the greenhouse according to FIG. 7, which is indicated by VIII in FIG. 7.
Figure 9:
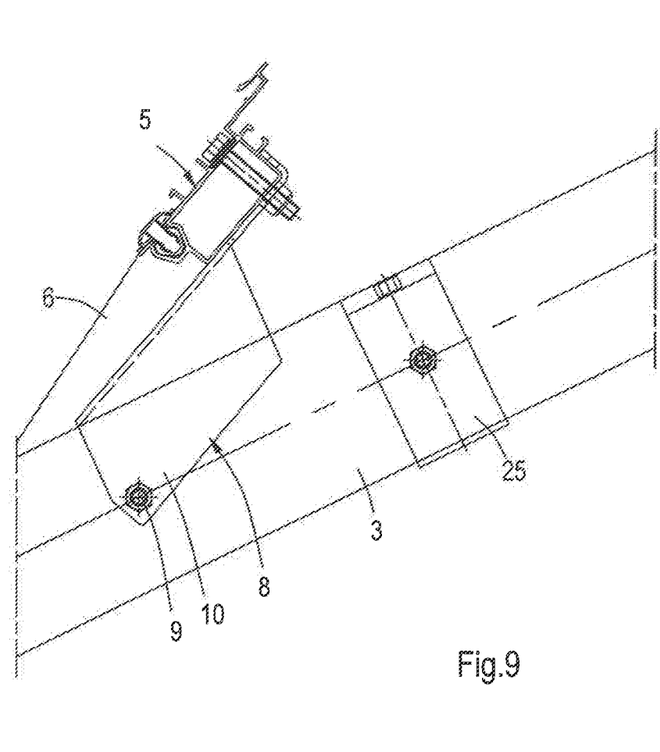
FIG. 9 is a similar view as FIG. 8, but showing the part in a different condition.
Figure 10:
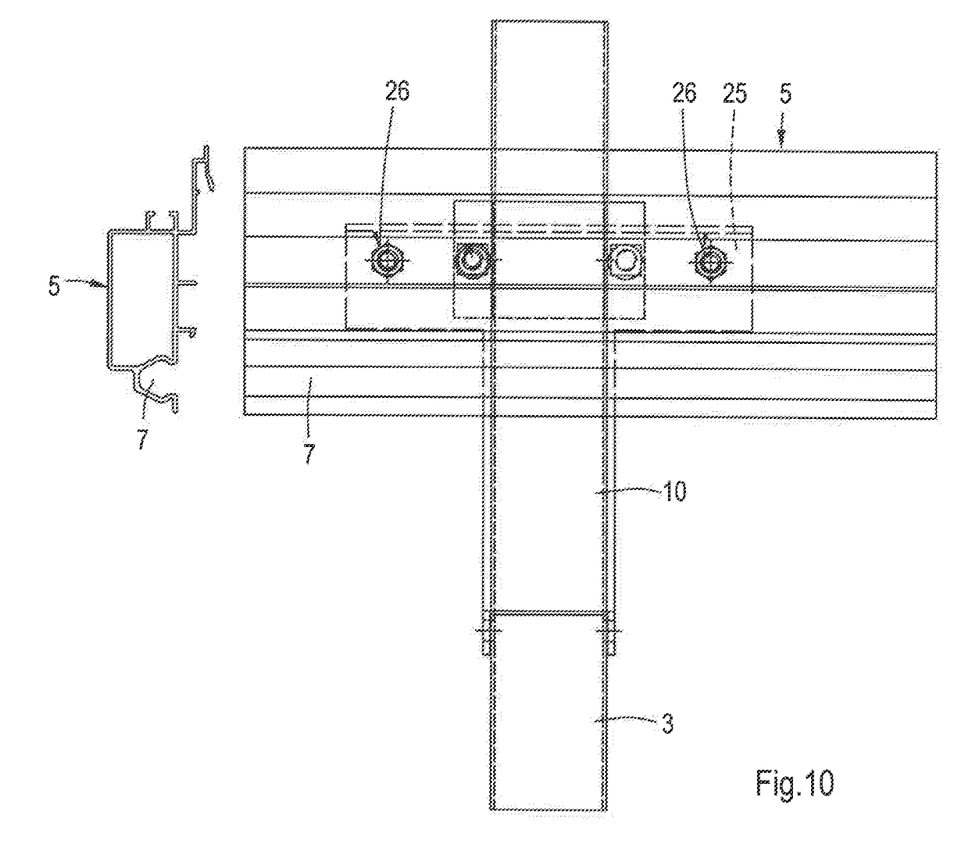
FIG. 10 is a top view of the part as shown in FIG. 8 and a partial side view thereof.

FIGS. 8 and 9 show the displaceable longitudinal section 5 of one of the lower roof parts 21 in more detail and in two different positions, respectively, in order to illustrate a manner of applying the foil 6 at the lower roof part 21. In both positions of FIGS. 8 and 9 the window part 22 is open in order to provide sufficient space to operate the displacement mechanism 8 of the lower roof part 21. The displacement mechanism 8 of the lower roof part 21 is similar to the displacement mechanism 8 as shown in FIGS. 2-6, but it has a different lock. FIGS. 8-10 show that crossbeam brackets 25 are fixed to the crossbeams 3. The displaceable longitudinal section 5 can be fixed to the crossbeam brackets 25 by bolts 26.

When installing the foil 6 at the lower roof part 21 the foil 6 is first fixed in the foil receiving slot 7 of the displaceable longitudinal section 5 and then fixed in the foil receiving slot of the corresponding gutter 4. Before fixing the foil 6 at the gutter 4 the foil 6 is pulled in a direction from the displaceable longitudinal section 5 towards the gutter 4 such that the pivot arm 10 including the displaceable longitudinal section 5 has a lifted condition as shown in FIG. 9 and the foil 6 is substantially taut. Subsequently, the pivot arm 10 including the displaceable longitudinal section 5 is pushed downwardly, hence tensioning the foil 6, after which the displaceable longitudinal section 5 can be fixed to the crossbeam brackets 25 by tightening the bolts 26.

Figure 11:
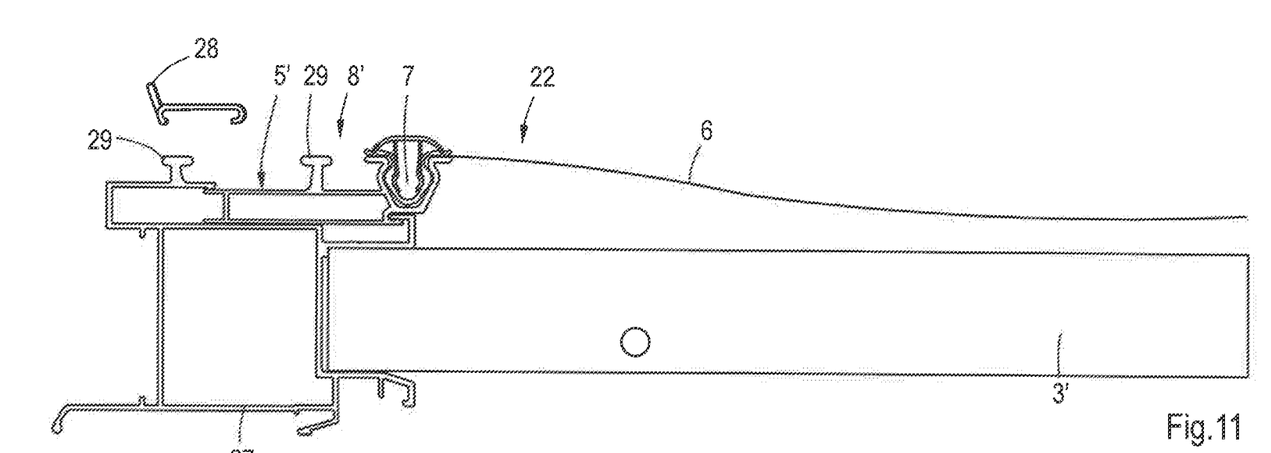
FIG. 11 is an enlarged view of a part of the greenhouse according to FIG. 7, which is indicated by XI in FIG. 7.
Figure 12:
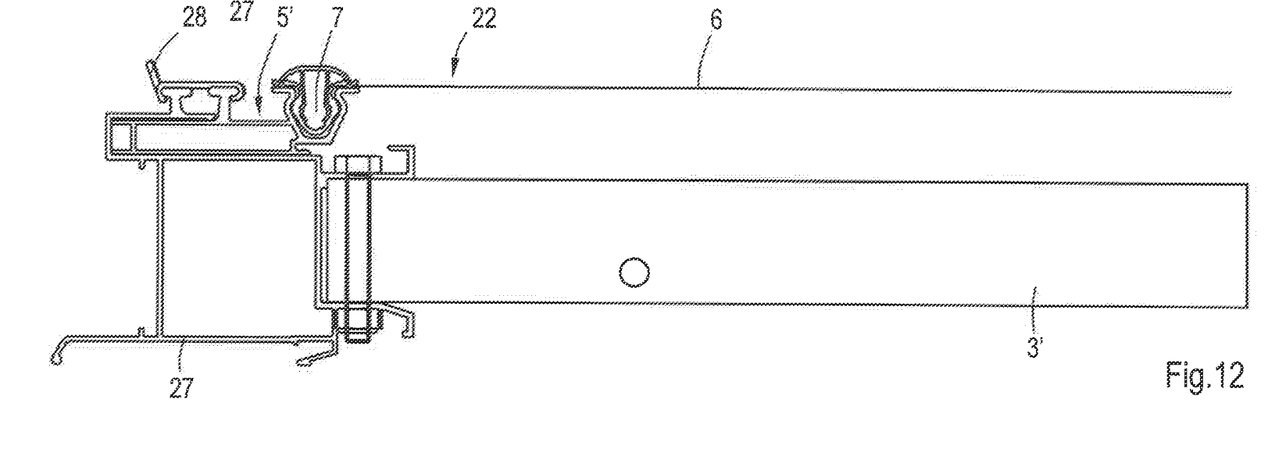
FIG. 12 is a similar view as FIG. 11, but showing the part in a different condition.

FIGS. 11 and 12 show a portion of the window part 22 in more detail. The displaceable longitudinal section 5' of the window part 22 is slidably mounted to a lower window beam 27, which in turn is fixed to the window crossbeams 3' of the window part 22. The lower window beam 27 extends parallel to the ridge section 20 and the upper window beam 24. FIGS. 11 and 12 show the displaceable longitudinal section 5' of the window part 22 in the non-foil-stretching position and the foil-stretching position, respectively. In the latter position the longitudinal section 5' is locked to the lower window beam 27 by means of clips 28. The clips 28 are fixed to upwardly directed projections 29 which are part of the lower window beam 27 and the displaceable longitudinal section 5', respectively.

When installing the foil 6 at the window part 22 the foil 6 is first fixed in a foil receiving slot of the upper window beam 24, then slightly stretched and fixed to the foil receiving slot 7 of the longitudinal section 5', as shown in FIG. 11, after which the longitudinal section 5' is moved in a direction away from the upper window beam 24 and locked to the lower window beam 27 by means of the clips 28.

When the window part 22 is in its closed position the lower window beam 27 thereof rests on the displaceable longitudinal section 5 of the corresponding lower roof part 21, see FIG. 7.

The invention is not limited to the embodiments shown in the drawings and described hereinbefore, which may be varied in different manners within the scope of the claims and their technical equivalents.

What is claimed is:

1. A greenhouse having a roof comprising:
   a plurality of substantially parallel crossbeams;
   at least two longitudinal sections, each of which are mounted to the crossbeams and extend at a distance from each other in transverse direction of the crossbeams, and wherein one of the longitudinal sections is displaceable;
   a transparent foil which is mounted to the longitudinal sections at respective foil attachment locations thereof so as to form a cover between the longitudinal sections; and
   a displacement mechanism coupled to the one displaceable longitudinal section, the displacement mechanism configured to displace the one displaceable longitudinal section with respect to the other between a non-foilstretching position and a foil-stretching position, wherein a distance between the respective foil attachment locations is larger in the foil-stretching position than in the non-foil-stretching position, and wherein the displacement mechanism is operable and is lockable at an exterior upper side of the roof, and wherein the displacement mechanism comprises a lock configured to lock the one displaceable longitudinal section and the crossbeams to each other in the foil-stretching position, and wherein the lock is located at and accessible from the exterior upper side of the roof such that the lock is locked and unlocked at the exterior upper side of the roof.

2. The greenhouse according to claim 1, wherein the transparent foil contacts upper sides of the crossbeams in the foil-stretching position of the displaceable longitudinal section.

3. The greenhouse according to claim 1, wherein the crossbeams are curved.

4. The greenhouse according to claim 1, wherein said displacement mechanism comprises a pivot between one of the crossbeams and the displaceable longitudinal section, including a pivot axis that extends parallel to the displaceable longitudinal section at a distance from the foil attachment location of the displaceable longitudinal section.

5. The greenhouse according to claim 4, wherein the lock comprises a bolt which freely passes through a through-hole at the displaceable longitudinal section and which cooperates with a threaded hole in a lip that is locked with respect to the corresponding crossbeam in a rotational direction of the bolt and that is at least rotatable with respect to the crossbeam about an axis of rotation which has the same direction as the pivot axis, and wherein the displacement mechanism is provided with abutments for limiting movements of the lip with respect to the crossbeam in a direction along the crossbeam and in a transverse direction thereof.

6. The greenhouse according to claim 4, wherein the pivot axis is located between the foil attachment locations of the respective longitudinal sections.

7. The greenhouse according to claim 6, wherein the displaceable longitudinal section and the crossbeams are configured such that the foil attachment location of the displaceable longitudinal section moves upwardly upon displacing the displaceable longitudinal section from the foil-stretching position towards the non-foil-stretching position.

8. The greenhouse according to claim 1, wherein said displacement mechanism comprises a slidable connection between the crossbeams and the displaceable longitudinal section.

9. The greenhouse according to claim 8, wherein the displaceable longitudinal section, the other longitudinal section and the crossbeams are part of a window part which is rotatable with respect to a remainder of the roof between a closed position and an open position.

10. The greenhouse according to claim 8, wherein the slidable connection comprises at the displaceable longitudinal section a longitudinal beam being fixed to the crossbeams, which longitudinal beam slidably supports the displaceable longitudinal section.

11. The greenhouse according to claim 10, wherein the displaceable longitudinal section is lockable to the longitudinal beam through at least a clip which fits to upwardly directed projections at the displaceable longitudinal section and the longitudinal beam.

12. The greenhouse according to claim 1, wherein cross-sections of the crossbeams have curved upper sides.

13. The greenhouse according to claim 12 wherein the crossbeams are circular.

14. The greenhouse according to claim 12 wherein the crossbeams are elliptic.

\* \* \* \* \*